(12) United States Patent
D'Antimo et al.

(10) Patent No.: US 6,322,035 B1
(45) Date of Patent: Nov. 27, 2001

(54) SEAT TRACK WITH ZERO CHUCK LOCK

(75) Inventors: Jason D'Antimo, Barrie; Brent A. Hauck, Huntsville, both of (CA)

(73) Assignee: Dura Global Technologies, Rochester Hills, MI (US)

(*) Notice: Subject to any disclaimer, the term of this patent is extended or adjusted under 35 U.S.C. 154(b) by 0 days.

(21) Appl. No.: 09/394,156

(22) Filed: Sep. 13, 1999

Related U.S. Application Data

(60) Provisional application No. 60/114,635, filed on Jan. 4, 1999.

(51) Int. Cl.$^7$ ........................................................ B60N 2/00
(52) U.S. Cl. ................................................ 248/429; 248/393
(58) Field of Search ............................... 248/503.1, 424, 248/429, 430, 393; 297/344.1

(56) References Cited

U.S. PATENT DOCUMENTS

| | | | | |
|---|---|---|---|---|
| 3,310,274 | * | 3/1967 | Tanaka | 248/430 |
| 4,301,988 | * | 11/1981 | Parizet | 248/430 |
| 4,568,054 | * | 2/1986 | Degremont | 248/429 |
| 5,286,076 | * | 2/1994 | DeVoss | 248/479 |
| 5,524,504 | * | 6/1996 | Brandoli | 248/428 |
| 5,799,920 | * | 9/1998 | Wittkowsky | 248/429 |
| 5,806,825 | * | 9/1998 | Couasnon | 248/429 |
| 5,918,846 | * | 7/1999 | Garrido | 248/429 |

* cited by examiner

Primary Examiner—Alvin Chin-Shue
(74) Attorney, Agent, or Firm—C. R. Kiczek

(57) ABSTRACT

A vehicle seat mounting assembly includes a locking device mounted on an first track that moves relative to a second track. The mounting device includes a plurality of locking pawls that engage one or more slots on the second track so that the first track, and the seat, are maintained in a fixed position relative to the second track. The locking device includes a first release member for disengaging the locking device and adjusting the position of the seat. The release member includes a wedge-shaped end exerting a force on the at least one locking pawl to substantially reduce free play between the first and the second track when in the locked position.

19 Claims, 3 Drawing Sheets

SEAT TRACK WITH ZERO CHUCK LOCK

This application claims benefit of Provisional Application Ser. No. 60/114,635 filed Jan. 4, 1999.

BACKGROUND OF THE INVENTION

This invention relates generally to an assembly for mounting a seat within a vehicle. More particularly, this invention relates to a seat mounting assembly including a release lever which reduces the horizontal free play of the seat.

Seat track arrangements for mounting seats within vehicles are generally well known. Most arrangements provide for a seat to be moved or adjusted in forward and rearward directions within a vehicle. To provide the adjustment, a first seat track is typically movable relative to a second seat track, yet can be securely locked when the desired position is obtained. One disadvantage, however is that free play commonly exists between the seat track members such that, even in the locked position some relative movement is possible. This free play causes undesirable noise and vibration. Another matter of general concern in assuring the locking of the seat track assemblies is to provide secure placement of the seat for safety reasons.

Accordingly, it is desirable to provide a seat mounting assembly that permits easy forward and rearward adjustment while being securely lockable without the aforesaid free play.

SUMMARY OF THE INVENTION

In general terms, this invention is a vehicle seat assembly including a first track having a side wall including a plurality of spaced slots. A second track is supported for movement relative to the first track. A locking device is supported on the second track for movement into and out of a locking position. When the locking device is in the locking position, the second track remains stationary relative to the first track. Because the first track is fixedly mounted to the vehicle frame, the seat remains stationary in the vehicle when the locking device is in the locking position.

A release member is supported on the second track to move the locking device out of the locking position. Preferably, a handle is operatively coupled to the release member and is movable to move the release member into the disengaged position. Movement of the release member moves the locking device from a locked position to an unlocked position to allow a seat occupant to place the seat in a new preferred position.

The release member includes at least one actuator slot having a wedge-shaped end. The actuator slot engages at least one locking pawl to move the locking pawl from the locked to the unlocked position. At least one pawl is adapted to be received within one or more of the slots in the first track to restrain the second track from moving relative to the first track. When in the locked position the wedge-shaped end exerts a force on the at least one locking pawl to substantially reduce free play between the first and the second track when in the locked position.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
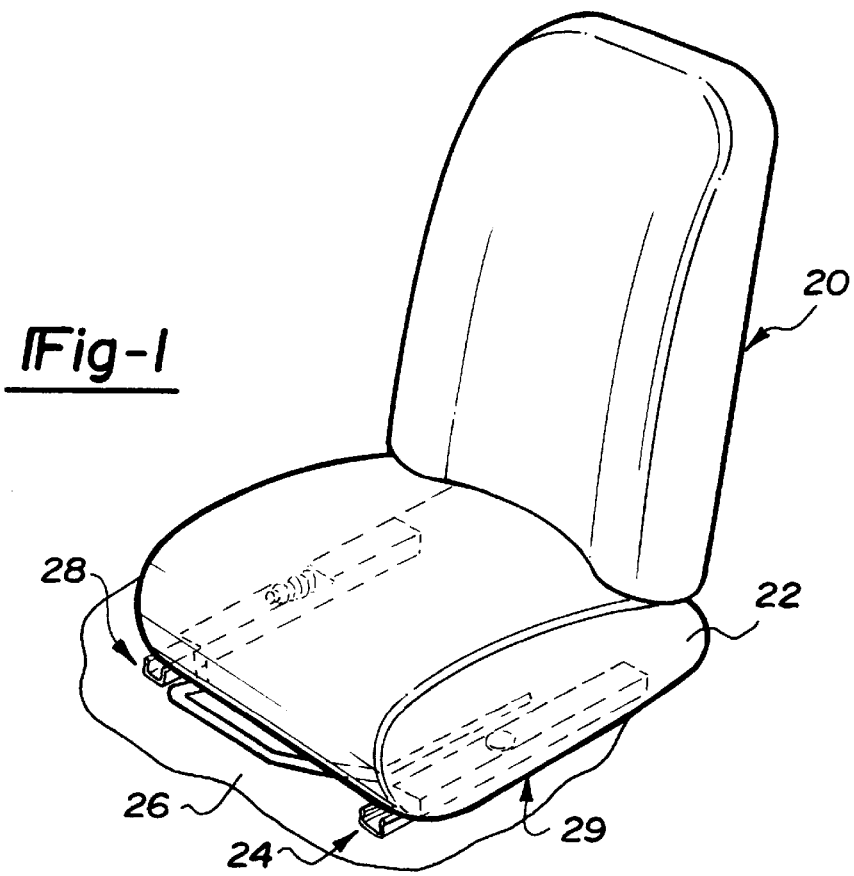
FIG. 1 is a diagrammatic, perspective illustration of a seat with a seat track mounting assembly designed according to this invention.

FIG. 1 diagrammatically illustrates a vehicle seat assembly 20. The seat assembly includes a seat base portion 22 that is mounted within the vehicle on a mounting assembly 24 attached to the vehicle frame 26. The mounting assembly 24 includes track assemblies on an inboard side 28 and an outboard side 29. The terms inboard and outboard are used in this specification for clarity and illustration purposes only and cannot be considered limiting.

Figure 2:
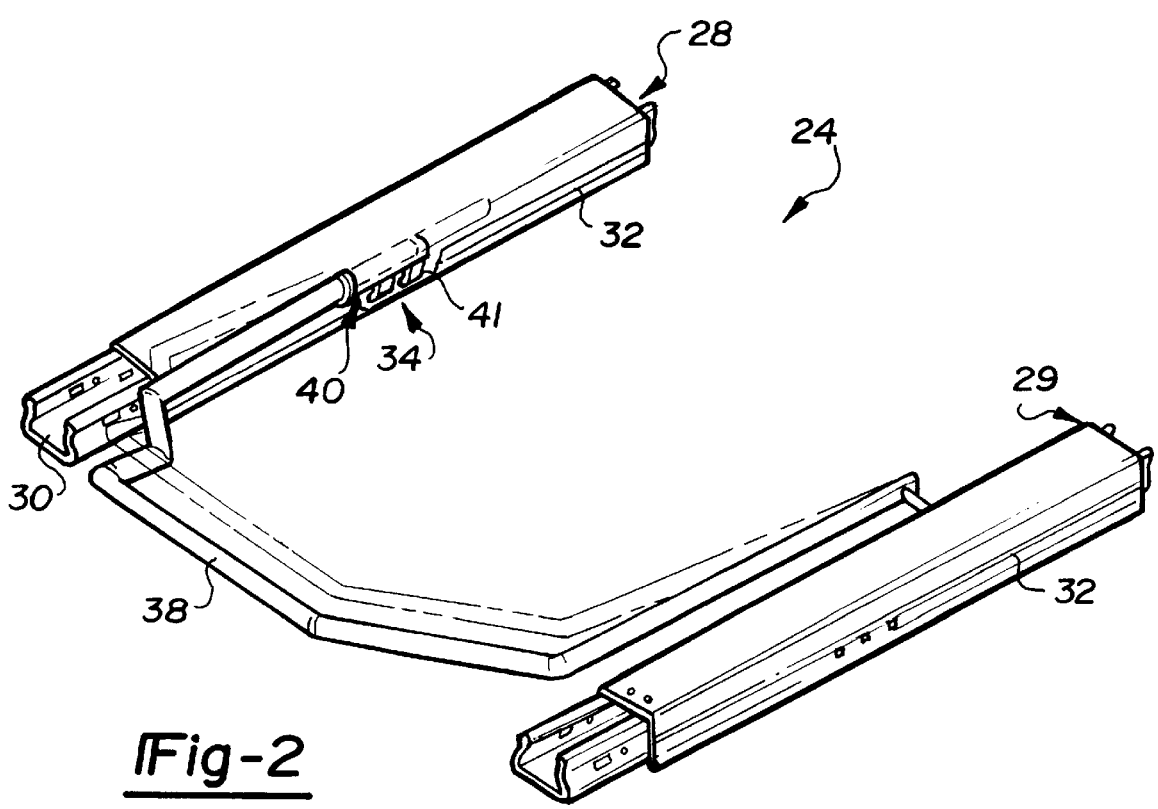
FIG. 2 is a perspective view of an embodiment of a seat track assembly designed according to the invention.

FIG. 2 further illustrates the mounting assembly 24, which includes a first track 30 and a second track 32 that is received over the first track 30 so that the second track 32 can be moved in a forward or rearward direction relative to the first track 30. The terms forward and rearward, as used in this specification, are for illustration purposes only and cannot be considered limiting. The profiles of the first track 30 and the second track 32 ensure that the second track 32 only moves along a longitudinal axis of the tracks and does not move in other directions.

The inboard side 28, and the outboard side 29 of the mounting assembly 24 include a locking device 34 that is supported on the second track 32. A handle 38 is accessible by a seat occupant from the front of the seat 20 to actuate a release member 40 to disengage the locking device 34 so that the position of the seat 20 can be adjusted. Although, the handle 38 is shown between the inboard 28 and outboard 29 track assemblies, one skilled in the art will realize that the handle 38, and the release member 40 can similarly be located on the outside of either track assemblies.

Figure 3:
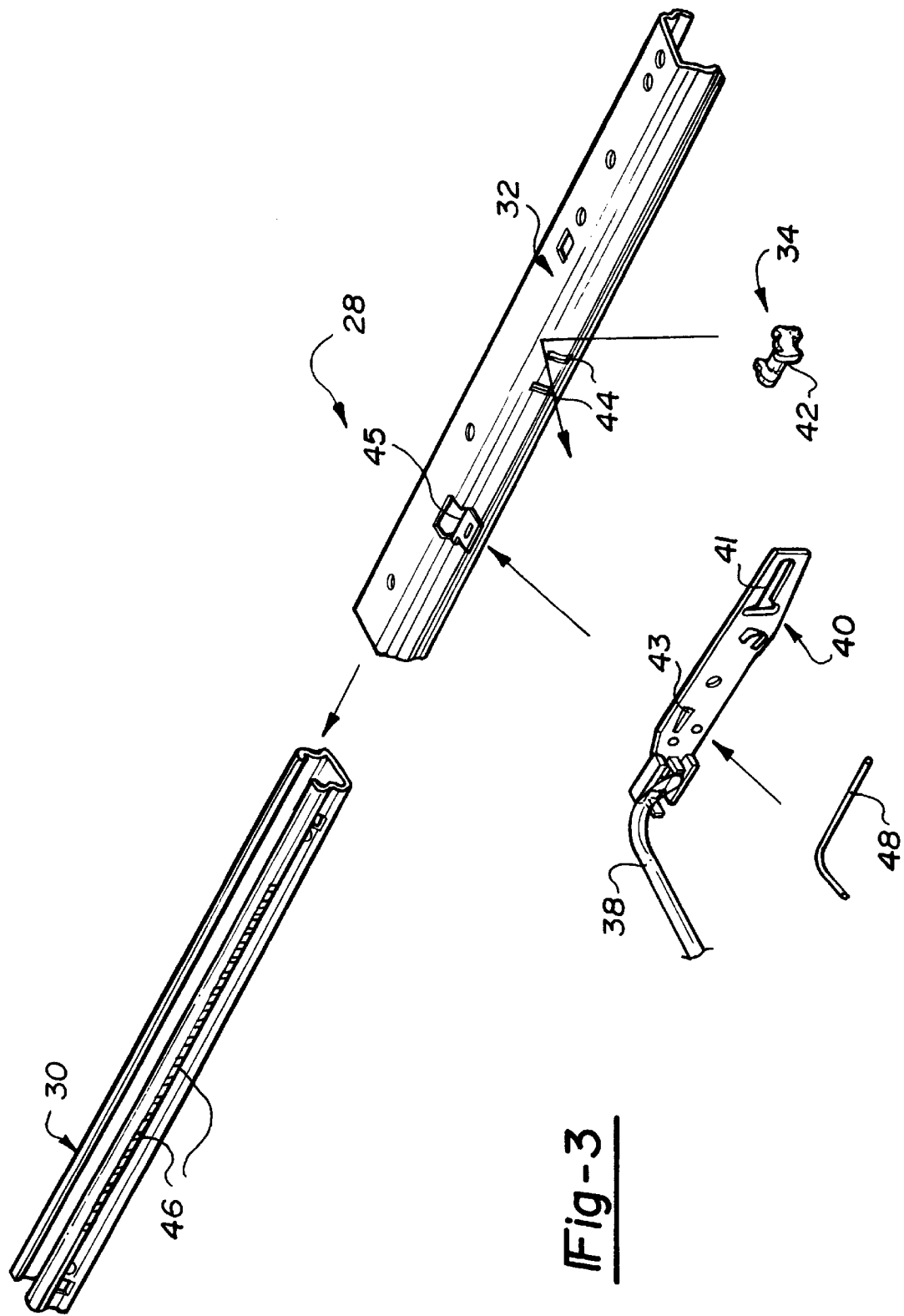
FIG. 3 is a perspective, exploded view of selected portions of the embodiment of FIG. 2.

The inboard side 28 of the assembly 24 is shown in an exploded, perspective view in FIG. 3. The locking device 34 preferably includes at least one locking pawl 42 positioned and sized to be received through a corresponding slot 44 in the second track 32. While one pawl 42 is shown, there may be a plurality of pawls. As will be further described below, the release member 40 includes a slot 41 which acts upon the locking pawls 42 to move the locking pawls 42 out of engagement with a plurality of slots 46 in the first track 30. When the locking pawl 42 extends through an appropriate slot 44 on the second track 32 and a slot 46 on the first track 30, the second track 32 is maintained in position relative to the first track 30.

The release member 40 further includes a lever slot 43 to pivotally mount the release member 40 to a tab 45 on the second track 32. A spring member 48 is preferably attached to the release member 40 and the second track 32 on the tab 45. The spring 48 biases the release member 40 and therefore the locking pawls 42 into the locked position. As illustrated, the release member 40 includes the slot 41 which acts upon the locking pawls 42 to move the locking pawls 42 out of engagement with a plurality of slots 46 in the first track 30.

By actuating the release member 40 with the handle 38, or the like, the release member 40 is moved against the spring 48 such that the locking pawl are unlocked by slot 41. When the locking pawls 42 are moved in a direction such that they no longer engage any of the slots 46 in the first track 30, the second track 32 and, therefore, the seat can be moved in a forward or rearward direction relative to the first track 30.

Once the handle 38 is released, the bias of the spring member 48 urges the release member 40 and therefore the locking pawls 42 back into a locked position where at least one of the locking pawls 42 is received through at least one of the slots 46 in the first track 30. Accordingly, the operative connection between the handle 38, the release member 40, the slot 41, and the locking pawl 42 provide one way for a seat occupant to disengage the locking pawls 42 so that the seat position may be adjusted.

Figure 4:
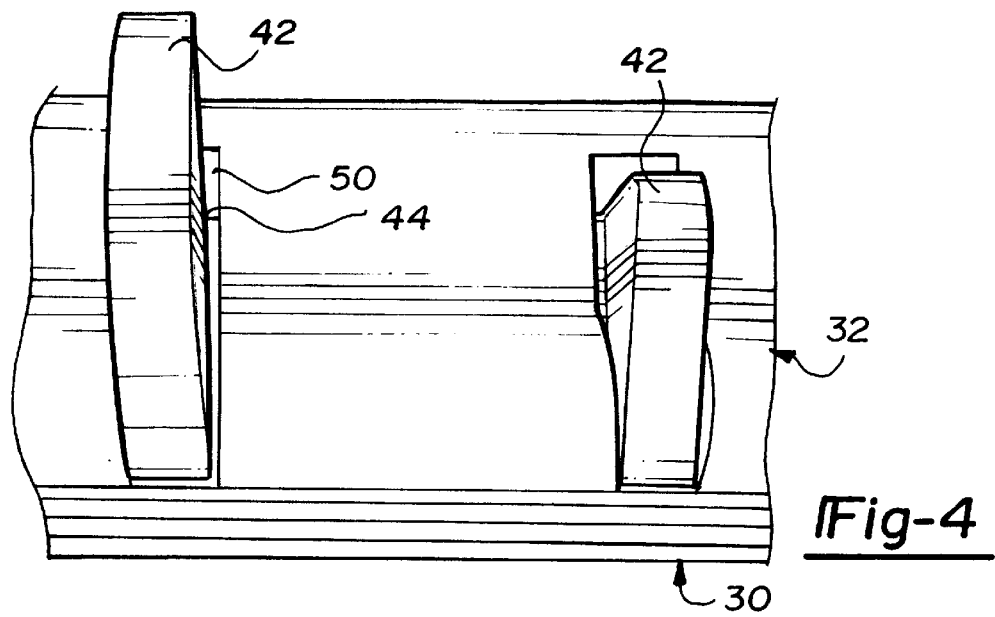
FIG. 4 is a perspective, exploded view of the locking device without the release member installed to illustrate the gap reduced by the present invention.

FIG. 4 illustrates the locking pawls 42 within the slots 44 without the release member 40 installed. As shown, a gap 50 exists between the locking pawls 42 and the second track 32. The gap 50, is necessary to assure that the locking pawl 42 can fully engage the second track 32 when manufacturing and design tolerances are considered. However, the gap 50 introduces undesirable free play between the first track 30 and the second track 32.

Figure 5:
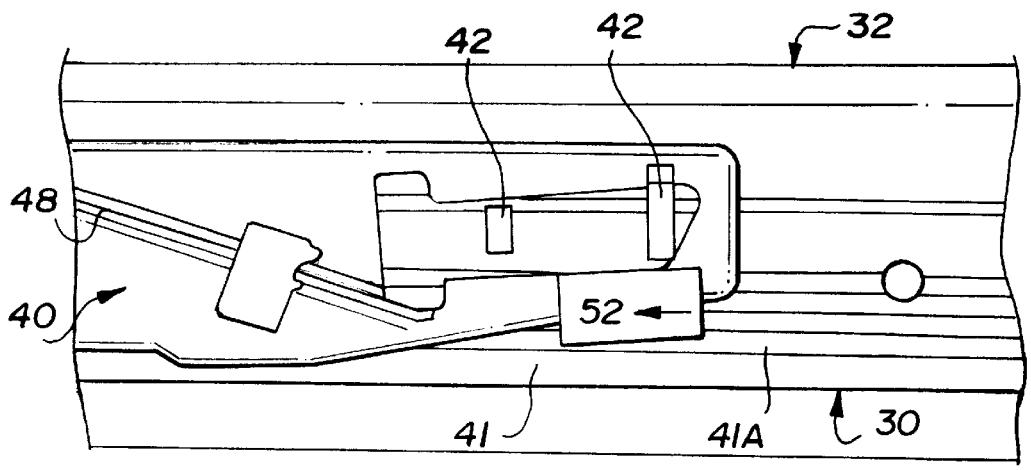
FIG. 5 is a perspective illustration of a preferred embodiment of a release member according to the present invention.

To greatly reduce the above describe free play, the slot 41 includes a wedge-shaped end 41A as illustrated in FIG. 5. When in the locked position the wedge-shaped end 41A exerts a force in the direction of arrow 52 on the locking pawl 42 to substantially reduce the free play between the first track 30 and the second track 32 by exerting a side force which eliminates or greatly reduces the gap 50. The wedge-shaped end 41A will maintain the force against the at least one locking pawl 42 as the release member 40 is biased by the spring 48 into the locked position.

Figure 6:
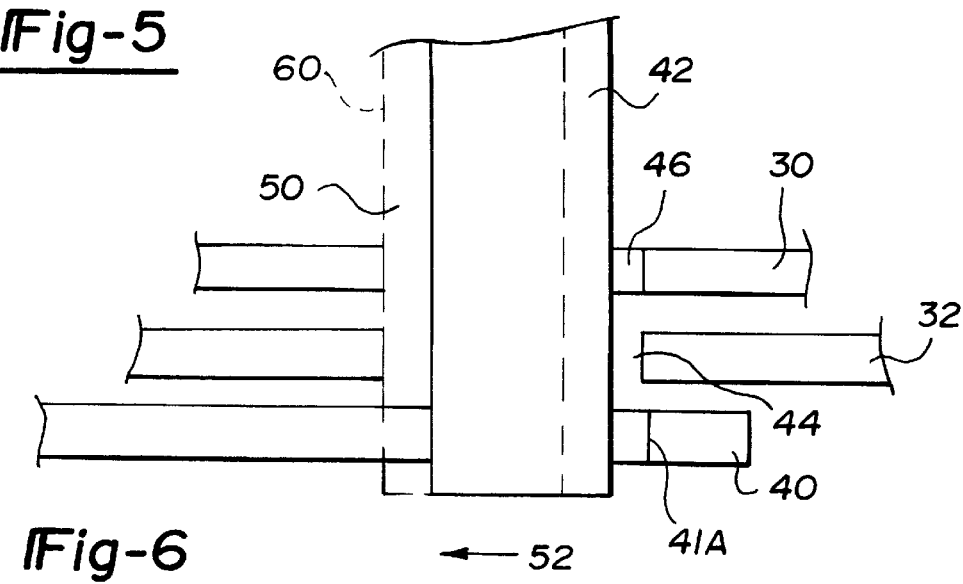
FIG. 6 is a top sectional view of the locking device and release member to illustrate the gap reduced by the present invention.

As shown in the sectional view of FIG. 6, the gap 50 is taken up by the release member 40 urging of the pawl 42. When in the locked position, the wedge-shaped end 41A of release member 40 exerts a force in the direction of arrow 52. The locking pawl 42 is thus forced along the length of the second track 32 such that the locking pawl 42 is biased to a position 60. Thus, the locking pawl 42 is urged to position 60 within slots 46 and 44, such that the gap 50 is eliminated. That is, due to the bias, the pawl 42 will rise along the ramp of the wedge-shaped end 41A until the gap 50 is taken up. Therefore the free play is reduced, and any associated noise or vibration is accordingly reduced.

The preceding description is exemplary rather than limiting in nature. Variations and modifications to the disclosed embodiment will become apparent to those skilled in the art that do not necessarily depart from the purview and spirit of this invention. Accordingly, the legal scope of protection for this invention can only be determined by studying the following claims.

What is claimed is:

1. An assembly for mounting a seat within a vehicle, comprising:

a first track including a plurality of slots through said first track;

a second track in movable mating engagement with said first track including at least one slot through said second track;

a locking device movable within said at least one slot for movement between a locked position wherein said locking device is received within one or more of said plurality of slots such that said second track does not move relative to said first track, and an unlocked position where said track is free to move; and a release member having an actuator slot with a wedge-shaped end, said release member operable to move said locking device from said locked to said unlocked position, said wedge-shaped end exerting a force on said locking device to move the locking device in a longitudinal direction relative to the first track toward an end of one of the plurality of slots and substantially reduce free play between said first and said second track when in said locked position.

2. The assembly according to claim 1, wherein said release member is spring biased in said locked position.

3. The assembly according to claim 1, wherein said release member is pivotally attached to said second track.

4. The assembly according to claim 1, wherein said force acts along the length of said first track and said second track.

5. The assembly according to claim 1, further comprising a handle to actuate said release member.

6. The assembly according to claim 1, further comprising a spring member urging the wedge-shaped end of the actuator slot toward the locking device and thereby urging the locking device into the locked position.

7. The assembly according to claim 6, wherein the spring member biases the release member wedge-shaped end into engagement with the locking device and thereby biases the locking device toward the end of the one of the plurality of slots.

8. The assembly according to claim 7, wherein the release member is pivotally attached to the second track.

9. An assembly for mounting a seat within a vehicle, comprising:

a first track including a plurality of slots through said first track;

a second track in movable mating engagement with said first track including at least one slot through said second track;

at least one locking pawl movable within said at least one slot for movement between a locked position wherein said at least one pawl is received within one or more of said plurality of slots such that said second track does not move relative to said first track, and an unlocked position where said track is free to move; and a release member having an actuator slot with a wedge-shaped end, said release member operable to move said at least one pawl from said locked to said unlocked position, said wedge-shaped end exerting a force on said at least one locking pawl to move the at least one locking pawl in a longitudinal direction relative to the first track toward an end of one of the plurality of slots and substantially reduce free play between said first and said second track when in said locked position.

10. The assembly according to claim 9, wherein said release member is spring biased in said locked position.

11. The assembly according to claim 9, further comprising a spring member urging the wedge-shaped end of the actuator slot toward the at least one locking pawl and thereby urging the at least one locking pawl into the locked position.

12. The assembly according to claim 11, wherein the spring member biases the release member wedge shaped end into engagement with the at least one locking pawl and thereby biases the at least one locking pawl toward the end of the one of the plurality of slots.

13. The assembly according to claim 12, wherein the release member is pivotally attached to the second track.

14. A vehicle seat assembly, comprising:

a vehicle seat;

a first track including a plurality of slots through said first track, said first track attached to the vehicle;

a second track in movable mating engagement with said first track including at least one slot through said second track, said second track attached to said vehicle seat;

at least one locking pawl movable within said at least one slot for movement between a locked position wherein said at least one pawl is received within one or more of said plurality of slots such that said second track does not move relative to said first track, and an unlocked position where said track is free to move;

a release member having an actuator slot with a wedge-shaped end, said release member spring biased in said lock position and operable to move said at least one locking pawl from said locked to said unlocked position, said wedge-shaped end exerting a force on said at least one locking pawl to move the at least one locking pawl in a longitudinal direction relative to the first track toward an end of one of the plurality of slots and substantially reduce free play between said first and said second track when in said locked position; and a handle to actuate said release member.

15. The assembly according to claim 14, wherein said handle is located under said vehicle seat.

16. The assembly according to claim 14, wherein said release member is located to a side of the seat.

17. The assembly according to claim 14, further comprising a spring member urging the wedge-shaped end of the actuator slot toward the at least one locking pawl and thereby urging the at least one locking pawl into the locked position.

18. The assembly according to claim 17, wherein the spring member biases the release member wedge shaped end into engagement with the at least one locking pawl and thereby biases the at least one locking pawl toward the end of the one of the plurality of slots.

19. The assembly according to claim 18, wherein the release member is pivotally attached to the second track.

* * * * *